June 2, 1942.　　　W. E. BARENTZEN　　　2,285,249
PINKING IMPLEMENT
Filed May 1, 1941
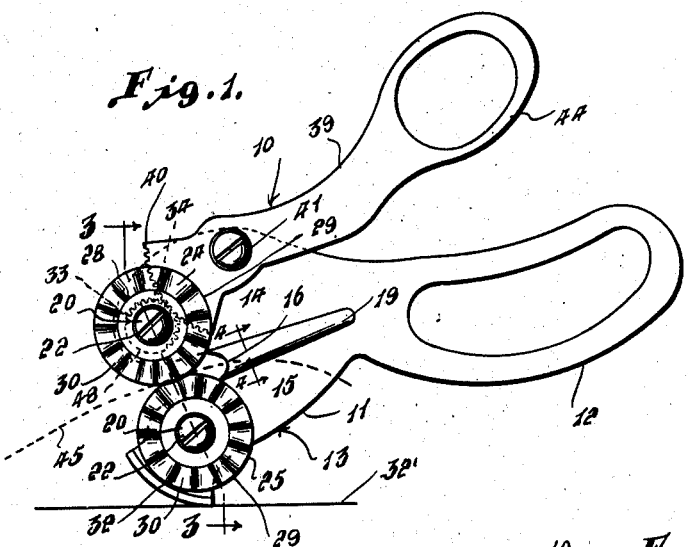
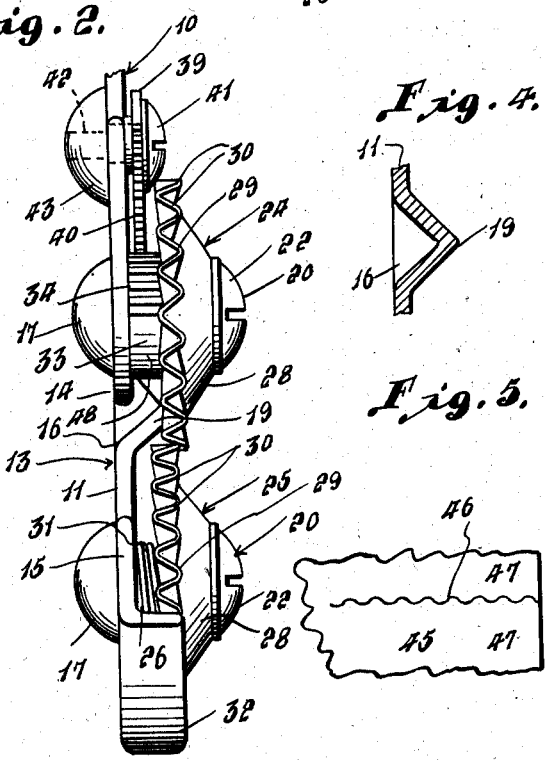
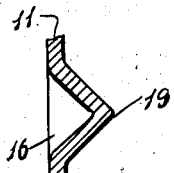
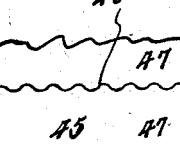
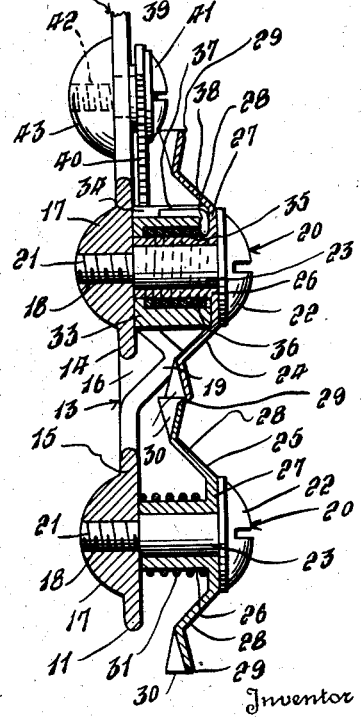
Inventor
Walter E. Barentzen
By L. F. Randolph
Attorney

Patented June 2, 1942

2,285,249

UNITED STATES PATENT OFFICE 2,285,249

PINKING IMPLEMENT

Walter E. Barentzen, New York, N. Y.

Application May 1, 1941, Serial No. 391,419

6 Claims. (Cl. 30—265)

This invention relates to a hand operated pinking implement, and more particularly to a shear type pinker of simple construction and which is adapted to be operated in the same manner as a pair of scissors for producing a pinking cut by means of a shear type cutting operation.

Still another aim of the invention is to provide a shear type cutter including a pair of rotatably mounted cutting disks.

Still a further aim of the invention is to provide a pair of coacting cutting disks which are provided with crimped or undulating outer portions adapted to be arranged in partially overlapping, meshing engagement for producing a shear type cut and for causing the cutting disks to revolve simultaneously in opposite directions when either of the cutting disks is driven.

Other objects and advantages of the invention will hereinafter become more fully apparent from the following description of the drawing, which illustrates a preferred embodiment of the invention, and wherein:

Figure 1 is a side elevational view of the pinking implement in its entirety,

Figure 2 is an end view in elevation of the same looking toward the end of the implement provided with the cutting disks, Figure 3 is an enlarged cross sectional view taken substantially along the plane of the line 3—3 of Figure 1, Figure 4 is an enlarged cross sectional view taken substantially along the plane of the line 4—4 of Figure 1, and Figure 5 is a plan view of a piece of sheet material which has been partially cut by the implement to illustrate the shape of the cut produced by the implement.

Referring more particularly to the drawing, wherein like reference characters designate like or corresponding parts throughout the different views, 10 designates generally the improved pinking tool or implement in its entirety, and which includes a supporting member 11, which is preferably formed of a substantially flat piece of metal, and which includes an elongated restricted end 12 which is curved slightly and which is provided with an elongated slot to form a fingerhold. The supporting member 11 is provided with an opposite bifurcated end, designated generally 13, having an upper furcation 14 and a lower furcation 15 which diverge outwardly, relatively to one another to form an inwardly converging recess or bight 16 therebetween, as best seen in Figure 1. The furcations 14 and 15, as best seen in Figure 3, are provided with enlargements 17 on corresponding sides thereof and which are provided with threaded openings 18 which extend therethrough, for a purpose which will hereinafter be described. The supporting member 11 is provided with a portion 19, which is V-shaped in cross section, as best seen in Figure 4, and which extends rearwardly from the inner end of the slot or recess 16, and which is disposed substantially in axial alinement with the bifurcated end 13. The portion 19 is formed by pressing the supporting member 11 outwardly on one side thereof, which side is opposite to the side from which the enlargements 17 project, and as best seen in Figure 1 the portion 19 tapers toward its rear end, or the end remote to the recess or bight 16.

A pair of screws, each designated generally 20, are each provided with a restricted threaded shank end 21 for engaging a threaded opening 18 to mount one of the screws 20 on the furcation 14 and the other screw 20 on the furcation 15. The screws 20 project from the sides of the furcations, opposite to the sides thereof provided with the enlargements 17, and are provided with enlarged heads 22 at their opposite ends. The screws 20, between their heads 22 and their restricted ends 21 are provided with smooth shank portions 23, forming axle portions, as will hereinafter become apparent.

The axle portions 23 are adapted to rotatably mount cutting disks 24 and 25, which are preferably of identical construction. Cutting disks 24 and 25 are provided with elongated hubs 26, which are of substantially the same length as the axle portions 23, which they are adapted to rotatably engage. The disks 24 and 25 include inner, substantially flat annular portions 27 which abut against the inner sides of the heads 22. Beyond the portions 27, the cutting disks have intermediate conical portions 28 which extend obliquely in a direction toward the support 11. Beyond the portions 28, the disks 24 and 25 are provided with marginal portions 29 which are disposed substantially parallel to the portions 27, and which are crimped, as best seen in Figures 2 and 3, to form the undulating edges 30, which are sharpened to form cutting edges. The diameters of the disks 24 and 25 are slightly greater than the distance between the axes of the screws 20 so that the crimped portions 29 slightly overlap and are arranged to intermesh, as seen in Figure 3, with the portion 29 of the lower cutting disk 25, which is attached to the lower furcation 15, disposed on the inner side of the disk 24. As seen in Figure 3, an expansion coil spring 31 is disposed around the hub 26 of the lower disk 25. One end of the spring 31 abuts against the furcation 15 and its opposite end abuts against the portion 27 to force the lower disk 25 outwardly of the support 11 to hold its crimped portion 29 in tight engagement with the crimped portion 29 of the disk 24.

As best seen in Figures 1 and 2, the outer, free end of the lower furcation 15 is bent outwardly to provide a guard flange 32 which extends beyond the portion 29 of the lower disk 25, and which is curved longitudinally to form a guard to prevent the edge 30 of the disk 25 from coming in contact with a surface, as seen at 32', over which the implement 10 is being moved, as will hereinafter become apparent.

A gear 33 is turnably mounted on the hub 26 of the cutting disk 24 and, as best seen in Figure 1, the gear 33 is provided with teeth 34 which extend partially therearound. The gear 33 is provided with an internal recess 35 in which is disposed a coil spring 36, which is coiled in a counterclockwise direction therearound from its inner end, which is disposed adjacent the furcation 14, to its outer end 37. The end 37 projects outwardly through an opening 38 in the gear 33. Opening 38 opens into an end groove, formed by the teeth at one end of the toothed portion 34 and the end 37 is bent to engage in said groove.

A lever 39 is provided with an arcuately shaped gear segment or rack portion 40, at one end thereof and is pivotally mounted, adjacent its end 40 on the support 11 by means of a screw 41, the threaded shank of which engages an opening 42 in an enlargement 43, which is disposed on the same side of the support 11 as the enlargements 17, so that the lever 39 is mounted on the opposite side of the support 11, or on the same side thereof as the cutting disks 24 and 25. The screw 41 is preferably of the same construction as the screws 20 and is arranged to position the lever 39 so that its rack portion 40 will mesh with the teeth 34. The opposite end of the lever 39 projects upwardly and rearwardly, relatively to the support 11, and is provided with an opening forming a thumbhold 44 which is disposed above the fingerhold 12, as best seen in Figure 1.

The pinking tool or implement 10 is adapted for use in cutting sheet material, such as cloth, as seen at 45, in Figure 5. The tool 10 is held, in the position as illustrated in Figure 1, with the fingers of the operator inserted through the slot of the fingerhold 12 and the thumb of the same hand inserted through the slot of the thumbhold 44 so that the tool 10 can be operated in the same manner as a pair of shears or scissors. The guard flange 32 is adapted to rest on a suitable supporting surface, as for example a table, as indicated by the line 32'. The sheet 45 is introduced to the tool 10 between the cutting edges 30 of the disks 24 and 25. By moving the end 44 of the lever 39 toward the portion 12 the gear segment end 40 will be swung upwardly to revolve the gear 33 in a counterclockwise direction, as seen in Figure 1. This will cause the spring 36 to be wound or tightened to thereby frictionally engage the hub 26 of the disk 24 so that the disk 24 will be rotated in a counterclockwise direction. The meshing engagement of the crimped portions 29 will cause the lower disk 25 to be simultaneously revolved in an opposite or clockwise direction thereby causing the cutting edges 30 to execute a shearing cut in the material 45, as the tool or implement 10 is advanced relatively thereto. When the end 44 of the lever 39 is swung away from the portion 12 the spring 36 will be unwound and released from the hub 26 of the disk 24 to prevent the disks from revolving in opposite directions, to the directions just previously described and to thereby return the lever 39 to a position where it can be again operated for revolving the disks 24 and 25 to execute another cutting stroke. It is to be understood that the implement 10 is advanced relatively to the sheet material 45 and produces an undulating cut in the material, as indicated at 46, in Figure 5. The apex of the V-shaped portion 19 is disposed substantially behind the cutting edges 30, as seen in Figures 2 and 3, for dividing the portions 47 of the sheet material 45, as the cut 46 is executed, in advance thereof. The teeth 34 extend only partially around the periphery of the gear 33 so that the portion 48 between the ends of the teeth 34 will form a stop to prevent the lever 39 from being swung too far to cause its rack portion 40 to move out of engagement with the teeth 34. As previously pointed out the spring 31 will hold the portion 29 of the disk 25 in tight engagement with the portion 29 of the disk 24 so that the cutting edges 30 will properly cooperate to produce a shearing cut.

Various modifications and changes are contemplated and may obviously be resorted to as only a preferred embodiment of the invention has been disclosed.

I claim as my invention:

1. A pinking implement comprising a frame member having a fingerhold at one end thereof and a bifurcated opposite end, cutting disks rotatably connected to the furcations of said bifurcated end, said cutting disks having crimped marginal portions, said crimped portions being enmeshed, a lever pivotally mounted on the frame member and having a fingerhold at one end thereof in complementary relationship to the fingerhold of the frame member, and ratchet means for connecting the opposite end of said lever to one of said cutting disks for rotating said cutting disk to cause the cutting disks to be rotated simultaneously in opposite directions.

2. An implement as in claim 1, said disks being disposed on one side of the frame, said frame comprising a substantially flat plate provided with a laterally pressed longitudinally extending portion, forming a continuation of the bight of the bifurcated portion and adapted to divide the cut portions of a piece of material after it has passed through and been cut by said disks, the forward end of the laterally pressed portion being disposed substantially in alinement with the planes of the disks.

3. A pinking implement comprising a pair of rotatably mounted disks having sharpened peripheries, said disks being provided with undulating outer portions, said undulating portions being enmeshed and partially overlapping, and means for revolving one of said disks to cause the two disks to revolve in opposite directions.

4. A pinking implement comprising a support member, a pair of cutting disks rotatably mounted thereon, and said cutting disks having intermeshed, undulating sharpened edges.

5. A pinking implement as in claim 4, comprising hand operated means for revolving one of said disks to cause said disks to turn simultaneously and at uniform speeds in opposite directions.

6. A pinking implement as in claim 4, comprising spring means for urging one of said cutting disks laterally of the supporting frame for yieldably retaining the cutting disks in tight coacting engagement.

WALTER E. BARENTZEN.